United States Patent [19]

Lilley et al.

[11] Patent Number: 5,278,219

[45] Date of Patent: Jan. 11, 1994

[54] FLEXIBLE HIGHLY FILLED COMPOSITIONS

[76] Inventors: Martin J. Lilley, 445 St. Clemens Ave., Toronto, Ontario, Canada, M5N 1M2; John M. MacLeod, P.O. Box 187, Kingston, Ontario, Canada, K7L 4V8; Raymond H. Servant, 2919 Appleton Court, Oakville, Ontario, Canada, L6J 6S5

[21] Appl. No.: 902,806

[22] Filed: Jun. 25, 1992

Related U.S. Application Data

[63] Continuation of Ser. No. 590,833, Oct. 1, 1990, abandoned, which is a continuation-in-part of Ser. No. 440,184, Nov. 22, 1989, abandoned.

[30] Foreign Application Priority Data

Nov. 25, 1988 [GB] United Kingdom ............... 8827531

[51] Int. Cl.$^5$ ............................................. C08K 3/08
[52] U.S. Cl. ................................. 524/439; 524/413; 524/418; 524/434; 524/440
[58] Field of Search ............... 524/439, 440, 413, 418, 524/434, 439, 440

[56] References Cited

U.S. PATENT DOCUMENTS

| | | | |
|---|---|---|---|
| 3,491,056 | 1/1970 | Saunders | 574/439 |
| 3,895,143 | 7/1975 | Tarlow | 428/40 |
| 4,191,798 | 3/1980 | Schumacher et al. | 428/95 |
| 4,263,196 | 4/1981 | Schumacher et al. | 524/423 |
| 4,379,190 | 4/1983 | Schenck | 428/95 |
| 4,403,007 | 9/1983 | Coughlin | 428/95 |
| 4,430,468 | 2/1984 | Schumacher | 524/109 |
| 4,434,258 | 2/1984 | Schumacher et al. | 524/13 |
| 4,438,228 | 3/1984 | Schenck | 524/709 |
| 4,563,494 | 1/1986 | Ida | 524/398 |

FOREIGN PATENT DOCUMENTS

| | | |
|---|---|---|
| 815609 | 6/1969 | Canada . |
| 86-004577 | 2/1987 | China . |
| 0339760 | 2/1989 | European Pat. Off. . |
| 1127581 | 3/1960 | Fed. Rep. of Germany . |
| 1913099 | 10/1968 | Fed. Rep. of Germany . |
| 57-005732 | 1/1982 | Japan . |
| 57-141430 | 9/1982 | Japan . |
| 57-158258 | 9/1982 | Japan . |
| 58-053928 | 3/1983 | Japan . |
| 59-126296 | 7/1984 | Japan . |
| 60-026651 | 2/1985 | Japan . |
| 60-079065 | 5/1985 | Japan . |
| 60-213997 | 10/1985 | Japan . |
| 61-228051 | 10/1986 | Japan . |
| 62-080031 | 4/1987 | Japan . |
| 666757 | 8/1988 | Switzerland . |
| 1603654 | 11/1981 | United Kingdom . |
| 1603655 | 11/1981 | United Kingdom . |

*Primary Examiner*—Paul R. Michl
*Assistant Examiner*—John J. Guarriello
*Attorney, Agent, or Firm*—John F. A. Earley; John F. A. Earley, III

[57] ABSTRACT

Highly filled materials are disclosed. The material is formed from a composition of at least 4% by weight of a defined polar thermoplastic polymer, a plasticizer for the polymer and at least 90% by weight of an inorganic composition, including in elemental form. The compositions have a flexural modulus of less than 100 MPa. Preferably, the material provides attenuation against energy of greater than 0.1 keV that is equivalent to at least 0.1 mm of lead. The material may be used for containers, in apparel and other end-uses for protection against e.g. x-rays and gamma rays.

8 Claims, No Drawings

FLEXIBLE HIGHLY FILLED COMPOSITIONS

RELATED PATENT APPLICATION

This is a continuation of application Ser. No. 07/590,833 filed Oct. 1, 1990, now abandoned, which in turn is a continuation-in-part of application Ser. No. 07/440,184 filed Nov. 22, 1989, now abandoned.

BACKGROUND OF THE INVENTION

1. Field of the Invention

The present invention relates to flexible highly filled compositions, including highly filled compositions of polymers and elastomers, that may be used in a variety of end-uses, including attenuation of or protection against sound and electromagnetic radiation and as energy conducting materials. The compositions contain at least 90% by weight of filler and are flexible, with a flexural modulus of less than 100 MPa.

2. Description of the Prior Art

Highly filled compositions are capable of being used in a wide variety of applications, especially protection against sound and against electromagnetic radiation and in electrically conductive applications e.g. shielding of apparatus. Examples include mobile flexible X-ray screens, folding X-ray doors, flexible electrical conductors, sound insulating materials, electromagnetic energy screens for apparel e.g. protection against x-rays and beta and gamma radiation, flexible magnets, electrical resistant heating mats and the like, and electrical grounding systems. In some such end-uses, it is important that the material be flexible and resistant against cracking e.g. apparel or containers, whereas in other end-uses it is preferred that the material be rigid e.g. in wall panels or ceiling tiles, or semi-rigid e.g. floor tiles.

A number of filled materials have been proposed for use as protection against radiation. For instance, Japanese patent application No. 58-053928 of K. Yamamoto, published Mar. 30, 1983 discloses an elastic (rubber) foam material, preferably polychloroprene rubber, containing large quantities e.g. 80-87.3% by weight, of metal constituents. The use of lead oxide is disclosed, as well as the use of material containing barium ferrite/nickel ferrite and barium ferrite/magnesium ferrite for protection against magnetism. The compositions also contain minor amounts (<0.5%) of rubber processing aids e.g. magnesium oxide, zinc oxide and lead stearate.

Japanese patent application No. 57-141430 of K. Yamamoto, published Sep. 1, 1982 discloses a leaded foam material comprising a foamed material having as its base a natural or synthetic rubber, preferably polychloroprene rubber, consisting of a mixture of rubber having a molecular weight averaging 20,000 with rubber having a molecular weight ranging from 2,000 to 12,000. 300 or more parts of organic and inorganic lead compounds e.g. lead oxide in amounts of 80-87.3% by weight, are added to 100 parts by weight of the base material. The compositions contain minor amounts (<0.5%) of rubber processing aids e.g. magnesium oxide, zinc oxide and lead stearate.

Canadian Patent 815 609 of J. D. McCluer et al., issued Jun. 17, 1969 discloses a flexible material comprising a fabric base and a layer of lead-loaded elastomeric e.g. polychloroprene, adhering to at least one surface of the fabric base. The lead is in the form of particles of a size smaller than 200 mesh, and constitutes at least 65% by weight of the total weight of the material.

Metal-polymer compositions having an elongation of less than 5% are exemplified in U.S. Pat. No. 3,491,056 of F. L. Saunders et al., issued Jan. 20, 1970.

U.S. Pat. No. 4,379,190 of T. T. Schenck, issued Apr. 5, 1983 discloses compositions of ethylene copolymers and plasticizer that contain 40-90 percent by weight of filler. The fillers exemplified are calcium carbonate and barium sulphate. Related U.S. patents include U.S. Pat. Nos. 4,191,798, 4,263,196 and 4,434,258 all of F. G. Schumacher et al., 4,403,007 of M. C. Coughlin, 4,430,468 of F. G. Schumacher and 4,438,228 of T. T. Schenck.

Japanese patent application No. 61 228 051 of Dainichi Nippon Cables, published Oct. 11, 1986 discloses compositions of ethylene/vinyl acetate and/or ethylene/ethyl acrylate copolymers that contain 5-50 parts of antimony oxide and 5-100 parts of barium sulphate, per 100 parts of polymer, as a wire coating composition. Cross linking of the coated wire with electrons is disclosed.

U.S. Pat. No. 4,563,494 discloses a polymer composition formed from 0.001 to 10% of at least one lanthanide oxide or hydroxide, and organic salts or complexes and a polymer containing e.g. acrylic or methacrylic acid or ester units, for use as a shield against neutron radiation.

U.K. Patents 1 603 654 and 1 603 655, granted Nov. 25, 1981 disclose compositions of metallic lead in polyvinyl chloride as an x-ray absorption material.

Japanese patent application 59 126 296 of Mitsui Petrochemical, published Jul. 20, 1984 discloses the lamination of films of e.g. ethylene/vinyl acetate/carbon monoxide terpolymers onto films of e.g. ethylene/vinyl ester copolymers containing at least 50% by weight of metallic lead, for use in the atomic power industry.

Japanese patent application 57 005 732 of Furukawa Electric Co., published Jan. 12, 1982 discloses compositions of polyolefins e.g. ethylene/vinyl acetate copolymers, containing 30-300 parts, per 100 parts of polymer, of an inorganic powder e.g. barium borate.

Heavy, thick sound insulation using specific low cost barium salts to replace lead compounds is disclosed in Chinese patent application 86004577 of Liu et al. The addition of 100-3000 parts by weight of a metal, metal oxide, metal salts or fillers e.g. iron oxide, ferrite, lead oxide, tin oxide, barium or lead sulphate, barium or lead carbonate, to bituminous or bituminous/rubber compositions is disclosed in Japanese patent application 60 079 065 of Ube Industries, published May 4, 1985. Sound insulating sheet formed by coating iron foil with tin/lead is disclosed in Japanese patent application 60 026 651 of Riken KK, published Feb. 9, 1985.

Compositions of 100 parts of polymers and 20-800 parts of powders of high specific gravity, for use in the manufacture of pipes, are disclosed in Japanese 62 080 031 of Dainichi Nippon Cables, published Apr. 13, 1987. Examples of the polymers are polyethylene, polypropylene and polyvinyl chloride and of the powder are lead, iron, litharge or clay. Japanese 60 213 997 of Toyo Soda, published Oct. 26, 1985 discloses sound insulation formed from 100 parts of polyvinyl chloride, 200-1000 parts of inorganic filler e.g. iron oxides, barium sulphate and lead powder, and plasticizers and thylene/butene-1 copolymers and 600 parts of lead monoxide are exemplified in Japanese 57 158 258 of Hitachi Cable KK, published Sep. 30, 1982.

Japanese Kokai 59 126 296 of S. Madao et al., published Jul. 20, 1984 relates to a laminated composition for shielding against radiation, formed from lead or lead compound in a copolymer resin laminated to plasticized polyvinyl chloride. The copolymer may contain roll releasing agents, blocking inhibiting agents and the like, and the polyvinyl chloride may contain tin maleate and magnesium oxide.

Although the prior art reports compositions of fillers and polymers on a weight basis, the amount of filler on a volume basis is believed to be more important, especially with respect to processing of the compositions. Generally, polymers filled to 5-25% by volume retain a high degree of flexibility, resilience, elongation, elasticity, resistance to flex cracking and the like, whereas polymers filled to 20-50% by volume, if achievable with the aid of plasticizers and suitable combinations of polymers and fillers, tend to be rigid or semi-rigid and brittle and frequently have low resistance to flexing or low tensile strength. In the latter, the polymer is essentially a binder or adhesive for the filler. So-called vinyl floor tiles exemplify highly filled polymer compositions that are generally brittle with low flexibility.

Radiation attenuation materials in the form of mixtures of two or more elements or compounds thereof are disclosed in U.S. Ser. No. 07/440,494 of M. J. Lilley, G. E. Mawdsley, G. P. Reh and M. J. Yaffe, filed Nov. 22, 1989. Radiation protection material, especially apparel, is disclosed in U.S. Ser. No. 07/440,495 of M. J. Lilley, J. M. MacLeod, G. E. Mawdsley, G. P. Reh and M. J. Yaffe, filed Nov. 22, 1989.

SUMMARY OF THE INVENTION

A flexible highly filled polymeric composition and material formed from a thermoplastic polymer and containing elements or inorganic compounds, that may be used as an energy absorptive or conductive material e.g. for x-rays, gamma rays, sound or electricity, have now been found.

Accordingly, the present invention provides a flexible highly filled material comprising a layer formed from a melt processable composition comprising (a) at least 4% by weight of a thermoplastic polymer selected from copolymers of ethylene with at least one of vinyl acetate, alkyl acrylate, alkyl methacrylate, glycidyl methacrylate, acrylic acid, methacrylic acid and carbon monoxide, and mixtures thereof, ionomers of such copolymers, and such copolymers that have been grafted with a monomer selected from the group consisting of ethylenically unsaturated carboxylic acids and anhydrides and other derivatives thereof;

(b) a plasticizer for such copolymers; and (c) at least 90% by weight of a solid inorganic composition that is selected from the group consisting of (i) at least one element selected from the group consisting of aluminum, antimony, barium, bismuth, cadmium, copper, iodine, iron, lead, magnesium, mercury, nickel, silver, tantalum, tellurium, tin, thallium, tungsten, uranium and zinc, (ii) at least one inorganic compound of an element of (i), and (iii) mixtures of (i) and (ii);

said composition having a flexural modulus of less than 100 MPa.

In a preferred embodiment of the invention, the composition has a flexural modulus of less than 70 MPa, and especially less than 30 MPa.

In a further embodiment, the layer has a thickness such that the amount of attenuation of electromagnetic radiation having energies of greater than 10 keV is the equivalent of at least 0.1 mm of lead.

In another embodiment, the inorganic composition contains at least one element, optionally in the form of an inorganic compound, selected from bismuth, lead, mercury and uranium, and at least one element selected from antimony, barium, mercury, silver, tantalum, tellurium, tin and tungsten.

In yet another embodiment, the polymer composition has an elongation of greater than 15%, preferably greater than 100% and especially greater than 300 %.

DETAILED DESCRIPTION OF THE INVENTION

The present invention provides a composition or material, especially energy absorption or electrical conducting material, comprising at least one layer formed from a melt processable composition comprising at least 4% by weight of a thermoplastic polymer, a plasticizer for the polymer and at least 90% by weight of a solid inorganic composition; the latter is also referred to herein as inorganic component or filler. The compositions have a flexural modulus of less than 100 MPa, especially less than 70 MPa and preferably less than 30 MPa.

The polymer used to form the layer of the material of the present invention is selected from copolymers of ethylene with at least one of vinyl acetate, alkyl acrylate, alkyl methacrylate, glycidyl methacrylate, acrylic acid, methacrylic acid and carbon monoxide, and mixtures thereof. The polymer may also be an ionomer of such copolymers, especially an ionomer in which the metallic ion is sodium, zinc or aluminum. In addition, the polymer may be such a copolymer that has been grafted with a monomer selected from the group consisting of ethylenically unsaturated carboxylic acids and anhydrides and other derivatives thereof. Examples of such polymers include ethylene/vinyl acetate copolymers, ethylene/methyl acrylate copolymers, ethylene/methyl methacrylate copolymers, ethylene/acrylic acid copolymers, ethylene/alkyl acrylate/glycidyl methacrylate copolymers, ethylene/methacrylic acid copolymers, ethylene/n-butyl acrylate/carbon monoxide copolymers, ethylene/vinyl acetate/carbon monoxide copolymers and related polymers, and sodium and zinc ionomers of ethylene/acrylic acid and methacrylic acid. As used herein, it is understood that copolymers may have more than two monomers i.e. include polymers sometimes referred to as terpolymers The grafted polymers include such copolymers that have been grafted with maleic acid or maleic anhydride. In addition, the polymers may be cross-linked, subsequent to polymerization, with ionizing radiation or cross-linking agents in order to modify the properties of the polymer. Many examples of such polymers are available commercially e.g. from Du Pont Canada Inc., and/or the techniques for the fabrication and/or modification of such polymers are known in the art. In embodiments of the invention, the thermoplastic polymer of the composition may also include polyvinyl chloride in low proportions.

The composition used to form the layer also contains an inorganic component. The inorganic component is in the form of elements per se, including alloys, or in the form of inorganic compounds of the elements. Examples of such compounds include oxides, carbonates, sulphides, carbides and hydrides; it should be understood, however, that not all inorganic compounds may be used in the compositions used to form the layer, because of the flexibility requirements imposed thereon, as is illustrated hereinafter. The elements, or compounds, are used in a finely divided form and are uniformly dispersed throughout the thermoplastic polymer.

The particle size distribution and particle shape are important parameters with respect to the compositions, especially to maximize the filler loading for a predetermined flexibility and elasticity or to maximize flexibility and elasticity at a predetermined filler loading. For instance, fine particles when coated with polymer require a considerable volume in comparison to the amount of filler, and increase flexural modulus or rigidity. Thus, in preferred embodiments of the present invention, the filler used in the compositions has a low level of particles smaller than 400 mesh (38 microns). It is also preferred that the particles of largest diameter have a particle size that is not greater than 10% of the thickness of the layer or sheet that is to be produced from the composition e.g. a maximum particle size of 100 mesh (150 microns) is preferred In addition, the particles are preferably spherical particles or substantially spherical particles; such particles are often produced on grinding friable particles of larger and more irregular shapes. Mathematical relationships relating to the preferred distribution of particle sizes may also be derived.

The inorganic composition consists essentially of an element in the form of at least one element selected from the group consisting of aluminum, antimony, barium, bismuth, cadmium, copper, iodine, iron, lead, magnesium, mercury, nickel, silver, tantalum, tellurium, tin, thallium, tungsten, uranium and zinc. As noted above, the element may be in the form of an inorganic compound.

In preferred embodiments, the elements are selected from aluminum, antimony, barium, bismuth, cadmium, copper, iron, lead, mercury, nickel, silver, tantalum, tellurium, tin, tungsten and uranium. In further embodiments, the composition contains at least two of the elements, one of which is selected from bismuth, lead, mercury and uranium, and the other is selected from antimony, barium, cadmium, silver, tantalum, tellurium, tin and tungsten.

The composition used to form the layer comprises at least 90% by weight of the inorganic component and especially at least 91% by weight of inorganic component.

The composition also contains a plasticizer for the copolymer of the composition. The plasticizer must be compatible with the copolymer, and be of a type and used in an amount that does not result in bleeding or blooming of the plasticizer from the resultant composition. Moreover, the plasticizer must be compatible with the inorganic component added as part of the composition. Examples of such plasticizers include aromatic processing oils e.g. Sunthene TM 4240 plasticizer, trioctyl trimellitate, diisononyl phthalate and dioctyl phthalate. Other examples include other phthalate esters, phosphate esters, fatty acid esters, adipates, azelates, oleates, sebacates and sulfonamides. In preferred embodiments, the compositions contain at least 2% by weight of plasticizer, and especially at least 3% by weight of plasticizer.

The polymer composition used to form the layer may contain antioxidants, UV and other stabilizers and pigments, as will be appreciated by those skilled in the art.

The compositions are flexible highly filled compositions. As used herein, flexible is understood to mean that the compositions exhibit a flexural modulus of less than 100 MPa. In preferred embodiments, the compositions exhibit a flexural modulus of less than 70 MPa and preferably less than 30 MPa. Flexural modulus is measured by the procedure of ASTM D790, using 120 mil (3.18 mm) thick samples. The flexural modulus of the composition is important in order to provide apparel that is practical for wearing or which is capable of being used as a material for containers.

The layer of the composition is preferably of a thickness suitable for the absorption of energy or for electrical conductivity. In particular, the thickness is such that the amount of attenuation of electromagnetic radiation having energies of greater than 0.1 keV e.g. x-rays, is the equivalent of at least 0.1 mm of lead. In preferred embodiments, the thickness is such that the amount of attenuation is the equivalent of at least 0.1 mm, especially 0.25 mm of lead and in particular at least 0.5 mm of lead. Such equivalency is measured in the manner for determination of lead equivalency known in the art, using x-rays having an energy of 100 kV (also referred to as kVp), as described in Example I. In more general terms, equivalence is determined by measuring the broad area transmission of radiation of a sample of material for a radiation beam of known energy. The transmission is then measured in the same manner for a set of samples of commercially-pure lead of different known thicknesses, and the equivalence for the test sample is obtained by interpolation. Such equivalence only applies to the energy spectrum used in the test measurements. For diagnostic x-ray protection, a typical energy spectrum is obtained when a potential of 100 kVp is applied to an x-ray tube. Transmission is defined as the ratio of the exposure (coulombs/kg-air) measured in an ionization chamber with material in the beam to the corresponding exposure obtained without material in the beam.

Measurement of the absorbence of x-rays is made by the method described hereinafter in the examples.

In a further preferred embodiment, the composition has an elongation of greater than 15%, especially greater than 100% and in particular greater than 300%. Elongation is measured by the procedure of ASTM D-412.

If the material is to be used as electromagnetic energy absorption material in the form of apparel, it requires an acceptable flexibility and drape, as well as acceptable resistance to flexural cracking. Such a term is understood in the art of fabrics and related industries, and relates to the ability of the material to conform to the contours of a human body or other shapes.

The compositions of the present invention are melt processible, as illustrated by melt index data given in examples hereinafter. The compositions may be obtained by feeding the ingredients to melt compounding or similar equipment, the actual equipment depending in part on the actual composition to be prepared and the melt processing characteristics of that composition. Examples of compounding equipment include two-roll mills, Banbury mixers, Farrell TM continuous mixers, Buss TM co-kneaders, Gelimat TM high intensity mixers and the like. Compositions of high content of inorganic component and/or containing grafted polymers may be more difficult to process so as to obtain uniform compositions, and may require the use of high intensity mixers or the like. For instance, compositions of the invention may be compounded using a Banbury twin rotor internal mixer by addition of all of the ingredients into the mixer. It may, however, be preferable to prepare concentrates of plasticizer and/or the elements or compounds in polymer, and then compound the combinations of the concentrates in a high shear mixer; such use of concentrates may be less hazardous to operators of the equipment. The composition may be formed into sheet by extrusion, calendering, compression moulding or the like, a preferred method being by calendering.

Layer(s) of fabric may be added to the composition simultaneously with the formation of the layer of the composition or preferably in a separate step e.g. using a lamination technique; lamination may be achieved using adhesives or utilizing adhesive properties of the polymer used in forming the composition.

The present invention may be used in the form of apparel to protect the wearer from radiation, especially x-ray radiation, or shields for apparatus that produces radiation. The apparel may be in the form of full garments or in the form of vests or the like to protect portions of the human body. Alternately, the layers of the present invention may be used as containers or shields for radiation emitting products.

Although the present invention has been described with particular reference to layers of radiation protection material in the form of apparel or containers and shields for radiation-emitting materials, it is to be understood that the layers may also be in the form of coatings on or around an object. The attenuation material of the invention may also be used in a variety of other end-uses.

The present invention is illustrated by the following examples; unless noted to the contrary, all particles were 100−,200+ mesh. As used in the examples, exposure rate was measured using a calibrated ionization chamber at a position 100 cm from a tungsten target x-ray tube collimated to provide a beam measuring 8 cm×8 cm. The tube was powered by a constant-potential x-ray generator providing 100 kV at 10 mA with a resultant half-value layer (HVL) of 5.0 mm aluminum. Variation in output was less than 0.5%/hour. Samples of the compositions and of lead of known thickness were placed in the beam, 15 cm above the ionization chamber to determine the relative transmissions, and the lead equivalence for the composition was obtained by interpolation.

EXAMPLE I

A composition of metallic lead (92% by weight) in a blend of ethylene/vinyl acetate copolymers containing Sunthene 4240 aromatic processing oil was prepared using the Brabender melt processing apparatus. The metallic lead comprised 49% by volume of the composition; the lead had a particle size distribution such that 1–2% (by weight) would pass through a 100 mesh screen, an additional 24–28% would pass through a 200 mesh screen, an additional 25–30% would pass through a 325 mesh screen and the remainder was retained on the latter screen. The composition, of density 6.05 g/cm$^3$, was formed into highly flexible sheet having a thickness of 46 microns (18 mil).

It was found that for absorption equivalent to 0.5 mm of lead, the composition weighed 6.1 kg/m$^2$, and that the weight saving compared with lead-vinyl was 16%, with the same absorption.

The sheet of this example could be used for attenuation of x-rays and gamma rays, as well as for absorption of sound.

EXAMPLE II

A composition of copper powder (90.3% by weight) in a blend of ethylene/vinyl acetate copolymers containing Sunthene 4240 aromatic processing oil was prepared using the Brabender melt processing apparatus. The metallic copper comprised 50% by volume of the composition; the copper had a particle size distribution such that 27% (by weight) would pass through a 150 mesh screen, an additional 49% would pass through a 200 mesh screen, an additional 22% would pass through a 325 mesh screen and the remainder was retained on the latter screen. The composition, of density 4.93 g/cm$^3$, was formed into highly flexible electrically conductive sheet having a thickness of 56 microns (22 mil).

EXAMPLE III

A composition of metallic lead (32.2% by weight), metallic tin (27.6% by weight) and metallic tungsten (32.3% by weight) was prepared in an ethylene/vinyl acetate copolymer (7.9% by weight) using the Brabender melt processing apparatus; thus, the composition contained 92.1% by weight of inorganic components. The polymer composition obtained had a density of 6.03 g/cm$^3$.

Computer analysis indicated that the sample would provide a sample weight saving compared to lead/vinyl of 38%, for the same x-ray attenuation/absorption, based on thicknesses equivalent to 0.5 mm of lead.

EXAMPLE IV

A composition of lead sulphide (90% by weight) in a blend of ethylene/vinyl acetate copolymers (6% by weight) containing Sunthene 4240 aromatic processing oil (4% by weight) was prepared; the lead sulphide was a dry blend of lead sulphide (86%) and fine silicaceous sand (14%). The composition had a density of 4.44 g/cm$^3$ and a filler content of 90% by weight and 55% by volume. Sheet formed from the composition was flexible, tough and resilient.

As a comparison, a composition was formed from lead sulphide (85.5% by weight) in polyvinyl chloride (8.5% by weight) and dioctyl phthalate plasticizer (6% by weight). The composition had a density of 4.27 g/cm$^3$ and a filler content of 85.5% by weight and 50% by volume. Sheet formed from this composition was brittle with no significant tensile strength or flexibility.

This example shows that polyvinyl chloride would have to be used at filler loadings that are lower than those used with the ethylene/vinyl acetate copolymer, and with a corresponding increase in overall weight, volume and thickness in order to achieve the same amount of x-ray attenuation.

EXAMPLE V

A series of compositions were prepared with the same polymer and plasticizer compositions but with differing 200 mesh metallic lead, 325 mesh metallic lead and barium sulphate; the latter filler is a filler used in the aforementioned compositions of Schumacher and others.

The polymer was Elvax ® 265 ethylene/vinyl acetate copolymer and the plasticizer was Sunthene 4240 aromatic processing oil. A small amount of Kemamide ™ "U" slip agent and Nordel 2744 ethylene/propylene elastomer, to improve flex-cracking resistance, were added at levels of less than 0.5% by weight.

Physical property measurements were made on the compositions, using the following procedures:

Melt Index—procedure of ASTM D-1238 (condition E)
Tensile Strength—procedure of ASTM D-412
Elongation—procedure of ASTM D-412
Flexural Modulus—procedure of ASTM D-790

Further details and the results obtained were as follows:

TABLE I

| Run No. | 1 | 2 | 3 | 4 | 5 |
|---|---|---|---|---|---|
| Composition |  |  |  |  |  |
| Polymer (wt %) |  |  |  |  |  |
| Elvax 265 | 5.37 | 4.84 | 4.84 | 4.30 | 4.84 |
| Nordel 2744 | 0.27 | 0.24 | 0.24 | 0.22 | 0.24 |
| Plasticizer |  |  |  |  |  |
| Kemamide U | 0.54 | 0.49 | 0.49 | 0.44 | 0.49 |
| Sunthene 4240 | 3.81 | 3.43 | 3.43 | 3.05 | 3.43 |
| Filler |  |  |  |  |  |
| Lead (#200) | 90.0 | — | 91.0 | 92.0 | — |
| Lead (#325) | — | 91.0 | — | — | — |
| BaSO4 | — | — | — | — | 91.0 |
| Properties |  |  |  |  |  |
| Density | 5.35 | 5.56 | 5.66 | 6.03 | 3.11 |
| Melt Index | 48.1 | 38.3 | — | 27.2 | NF |
| Tensile str. | 2.4 | 2.6 | 2.4 | 2.0 | 0.37 |
| Elongation | 505 | 760 | 515 | 19 | 5 |
| Flex. mod. | 32 | 2 | 39 | 44 | NM |

Note: NF = no flow;
NM = not measurable, sample was brittle and cracked;
Density is reported in g/cm$^3$;
Melt index is reported in dg/min;
Tensile strength is reported in MPa;
Elongation is reported as a percentage;
Flexural modulus is reported in MPa and was measured on samples having a thickness of 120 mil (3.18 mm)

The results show that a composition prepared with barium sulphate as the filler, in a polymer composition that contained a plasticizer, was brittle with an elongation of only 5%; the melt index test indicates that the composition was not melt processable. Thus, the compositions with barium sulphate as filler are outside the scope of the present invention.

In contrast, the other compositions, using the same polymer and plasticizer at the same % composition by weight, were flexible and had good stretch, as indicated by the flexural modulus of 32-52 MPa and elongation of up to 760%. The compositions were melt processable, as indicated by the high values of melt index that were obtained.

Thus, the nature of the filler is critical to the properties of the composition that is obtained.

EXAMPLE VI

The procedure of Run 3 of Example V was repeated, except that the lead powder was oiled, to reduce dust particulates during processing, prior to blending with the polymer; the oil used was an aromatic hydrocarbon oil. The compositions were prepared by compounding in a Brabender apparatus, and then compression moulding.

It was found that the composition obtained had an elongation of 24%, compared with 515% for the composition of Run 3. In addition, in measurement of tensile properties, the composition did not exhibit a yield point and had an ultimate tensile strength of 2.92 MPa, whereas the composition of Run 3 had a yield point at an elongation of 48% and a tensile strength of 2.08 MPa.

This Example shows the substantial effect of oiling the filler prior to compounding with the polymer composition. While this Example illustrates the invention, comparison with the results of Run 3 shows that the method of processing of the composition may have an effect on the properties of the sheet (layer) obtained.

EXAMPLE VII

A series of compositions were prepared using pre-oiled filler viz. 200 mesh lead powder, but using a calendaring process to prepare sheet rather than a compression moulding process.

Further experimental details and the results obtained are given in Table II.

TABLE II

| Run No. | 7 | 8 | 9 | 10 | 11 |
|---|---|---|---|---|---|
| Composition |  |  |  |  |  |
| Polymer (wt %) |  |  |  |  |  |
| Elvax 265 | 6.02 | 5.37 | 4.84 | 4.30 | 3.87 |
| Nordel 2744 | 0.30 | 0.27 | 0.24 | 0.22 | 0.20 |
| Plasticizer |  |  |  |  |  |
| Sunthene 4240 | 4.27 | 3.81 | 3.43 | 3.05 | 2.74 |
| Kemamide U | 0.61 | 0.54 | 0.49 | 0.44 | 0.39 |
| Filler | 88.8 | 90. | 91.0 | 92.0 | 92.8 |
| Properties |  |  |  |  |  |
| Density | 4.70 | 4.89 | 5.56 | 5.93 | 6.23 |
| Melt Index | 28.1 | 20.2 | 18.0 | 12.9 | 11.8 |
| Flex. Mod. | 55.3 | 50.9 | 69.3 | 91.5 | 108 |
| Tensile str. |  |  |  |  |  |
| MD | 4.51 | 5.76 | 5.90 | 6.18 | 6.94 |
| TD | 2.57 | 2.57 | 2.08 | 2.22 | 2.92 |
| Elongation |  |  |  |  |  |
| MD | 140 | 65 | 60 | 60 | 40 |
| TD | 400 | 160 | 90 | 65 | 60 |

Note: Density is reported in g/cm$^3$;
Melt index is reported in dg/min;
Tensile strength is reported in MPa;
Elongation is reported as a percentage;
Flexural modulus is reported in MPa, and was measured on samples having a thickness of 120 mil (3.18mm)
MD = machine direction, TD = transverse direction
Run 7 is a comparative run This example shows that flexible sheet may be obtained using a calendaring process and a pre-oiled filler.

The compositions have high densities, up to 6.2 g/cm$^3$, and are excellent absorbers of radiation. The sheets of Runs 8-11 weigh only 7-11% more than sheet lead, which is commonly used for x-ray or sound absorption), but are flexible, easily heat-formed, weldable and with good flex crack resistance. There is a weight saving of about 14% over lead-vinyl, which typically has about 80% lead content.

Comparison of the data in Table II with that in Run 5 shows that the compositions of the invention show a 5-19 fold increase in tensile strength, as well as good elongation and flexibility.

We claim:

1. A flexible highly filled radiation shielding sheet consisting essentially of:
   (a) at least 4% by weight of a thermoplastic polymer selected from copolymers of ethylene including vinyl acetate and blends of such copolymers with ethylene/propylene elastomers;
   (b) a plasticizer for such copolymers; and
   (c) at least 90% by weight of a solid inorganic element or compound selected from the group consisting of copper, lead, tin, tungsten, and lead sulphide and mixtures thereof;

said sheet having a flexural modulus of less than 100 MPa and an elongation of at least 15%.

2. The highly filled sheet of claim 1 in which the sheet has a flexural modulus of less than 70 MPa.

3. The highly filled sheet of claim 6 in which the sheet has a flexural modulus of less than 35 MPa.

4. The highly filled sheet of claim 1 in which the sheet has a thickness such that the amount of attenuation of electromagnetic radiation having energies of greater than 10 keV is the equivalent of at least 0.1 mm of lead.

5. The highly filled sheet of claim 1 in which the sheet has an elongation of at least 100%.

6. The highly filled sheet of claim 1 in which the sheet has an elongation of at least 300%.

7. The highly filled sheet of claim 1 in which the inorganic element or compounds are in the form of particles having a size in the range of 38–150 microns.

8. The highly filled sheet of claim 1 in which the sheet has a thickness such that the amount of attenuation of electromagnetic radiation having energies of greater than 10 keV is the equivalent of at least 0.1 mm of lead.

* * * * *